United States Patent [19]

Riggs et al.

[11] 4,096,939

[45] Jun. 27, 1978

[54] APPARATUS FOR FEEDING GLASS CONTAINERS AT SPACED INTERVALS

[75] Inventors: Darius O. Riggs, Ottawa Lake, Mich.; Charles G. Vogel, Toledo, Ohio

[73] Assignee: Owens-Illinois, Inc., Toledo, Ohio

[21] Appl. No.: 666,294

[22] Filed: Mar. 12, 1976

[51] Int. Cl.² ........................ B65G 43/00; B65G 47/26
[52] U.S. Cl. .................................... 198/460; 198/491; 198/530
[58] Field of Search .............. 198/425, 459, 460, 530, 198/531, 491, 492

[56] References Cited

U.S. PATENT DOCUMENTS

| | | | |
|---|---|---|---|
| 2,757,780 | 8/1956 | Sousa | 198/425 |
| 3,263,794 | 8/1966 | Burton | 198/425 |
| 3,754,635 | 8/1973 | Mojden | 198/459 |

FOREIGN PATENT DOCUMENTS

| | | | |
|---|---|---|---|
| 599,936 | 3/1948 | United Kingdom | 198/460 |
| 798,944 | 6/1958 | United Kingdom | 198/460 |

*Primary Examiner*—Evon C. Blunk
*Assistant Examiner*—Douglas D. Watts
*Attorney, Agent, or Firm*—D. T. Innis; Myron E. Click; David H. Wilson

[57] ABSTRACT

Apparatus is disclosed which provides an entrance gating structure for spacing the entry of containers carried by a conveyor into a testing device. The containers arrive at the testing device under line pressure and are then permitted to enter a testing apparatus where they are conveyed through the testing device and then returned to the conveyor. The gating device is a spring-loaded pivot arm having a pair of legs. One leg stops the flow of containers until the prior container clears the length of the long or other leg. The gate functions automatically without requiring any external operator.

6 Claims, 3 Drawing Figures

APPARATUS FOR FEEDING GLASS CONTAINERS AT SPACED INTERVALS

BACKGROUND OF THE INVENTION

Typically, glass containers are tested for various functional defects. Testing may be done in a variety of testing equipment. Numerous optical inspecting devices have been used in the past in which containers are brought to the testing station of a testing apparatus and typically are rotated about their vertical axes during the inspection period to determine if optically reflecting flaws are present at various portions of the container. Other testing devices have been used to measure the physical dimensions of glass containers, the concentricity of the containers and other physical characteristics.

The containers generally arrive at a testing apparatus on a moving conveyor with the containers sitting upright and then are shunted from the conveyor into a testing apparatus which usually includes a system for handling the containers to carry them to a test station, or in some instances a plurality of test stations are provided, and the containers may be subject to various inspections at selected stations.

Recently, testing apparatus of the type which physically stresses the container have been placed on the market. An example of such a device may be found in U.S. Pat. No. 3,702,563. In testing apparatus of the type shown in the referred-to patent, the containers are precessed through a zone where they are subjected to diametrically applied forces and typically the container must rotate through at least 180° in order for the testing to be satisfactory in simulating an impact test of the entire glass container.

SUMMARY OF THE INVENTION

Apparatus for feeding glass containers to a testing device in which the containers are brought to the testing device in single file and are gated into the operation of the testing device by a pivoted, horizontal, arcuate arm having one end of the arm blocking entering containers until the prior container has passed beyond the influence of the other end of the arm, at which time another single container is permitted to pass, thus providing a mechanism which spaces the entry of containers into the testing device.

DETAILED DESCRIPTION OF THE DRAWINGS

Figure 1:
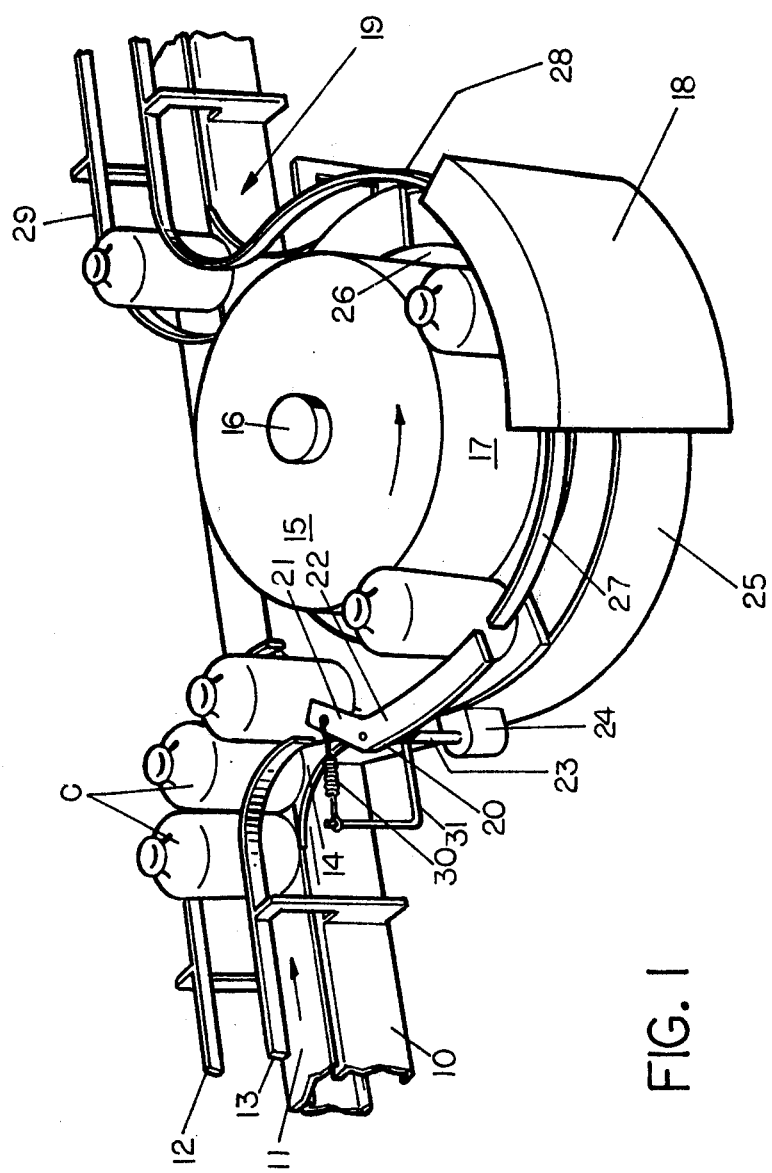
FIG. 1 is a perspective view of the apparatus of the invention in conjunction with a testing device.

The present invention may best be understood with reference to the drawings wherein the invention is shown in a typical environment of gating the entry of bottles into a testing device in which containers should be spaced one from the other.

A conveyor 10 having a continuously moving surface 11 moving in the direction of the arrow shown thereon, will convey a plurality of containers C thereon. Containers C are confined by a pair of guide rails 12 and 13 which have their forward ends curved to guide the containers under line pressure from the side of the conveyor surface 11. The containers, as they move from the surface 11 of the conveyor, are slid across a dead plate 14. The type of apparatus to which the invention is most suited is the infeed to an apparatus which engages the sidewall of the container to move the container through an arc while the container is confined between the moving wall-engaging surface and a guide rail. Such an apparatus is schematically shown in FIG. 1, in which a wheel 15, rotating about its axis 16, will engage containers with its circumferential surface 17 and thus move the containers from the entrance of the testing apparatus to and through the testing station which is schematically shown as box 18 and return the containers to the conveyor surface 11 at an exit 19 thereof.

The gating of the entrance of the containers to the testing apparatus is by way of an arm 20 which has a short leg 21 and a long leg 22.

As can best be seen from FIG. 1, the dead plate 14 extends around the periphery of the wheel 15 to approximately the same extent as where the extending end of the long leg 22 terminates. The arm 20 is mounted on a pivot shaft 23 which in turn is mounted on a boss 24 attached to the side of lower housing 25 of the testing apparatus. After the containers leave the surface of the dead plate 14, they are supported by an outwardly extending circular plate 26 which rotates with the wheel 15 and supports the heel and bottom of the container at one side thereof. A fixed guide rail 27 retains the bottle in contact with the surface 17 of the wheel 15 as the container precesses into the testing station 18 and through the testing station. After passing from the testing station, guide rails 28 and 29 will guide the containers back to the conveyor 10.

As can best be seen in FIG. 1, the arm 20 is mounted at the side of the apparatus at approximately the same height as the guide rails 13 and 27 and fills the gap created by the interruption of the guide rails in the area where the arm is shown. The arm 20 is biased in a counter-clockwise direction by a spring 30. The short leg 21 of the arm 20 is connected to one end of the spring 30 while the other end of the spring is fixed to a mounting post 31 fixed to the housing 25.

Figure 2:
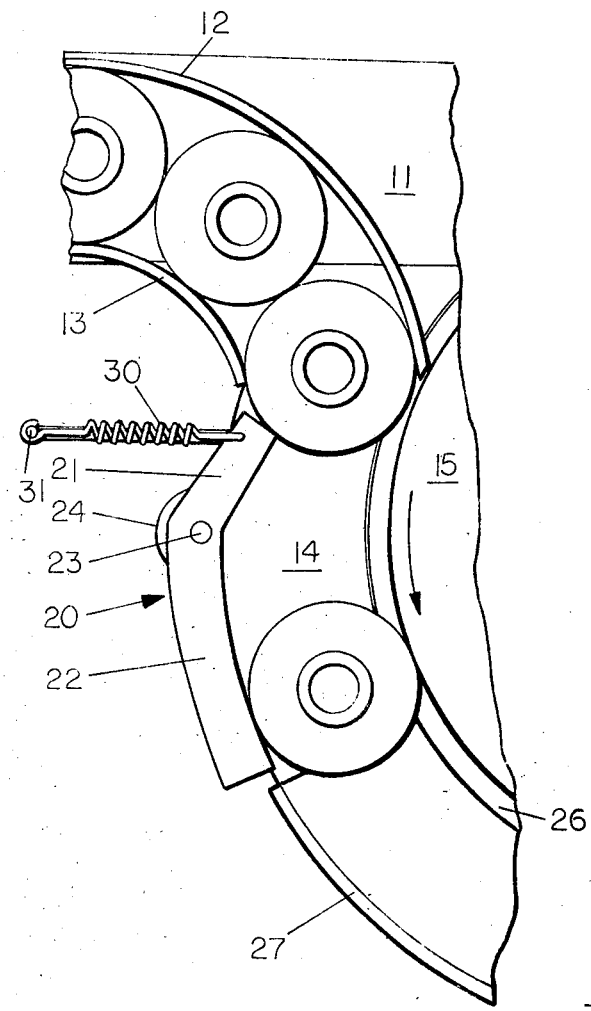
FIG. 2 is a plan view of the bottle entry area of FIG. 1.
Figure 3:
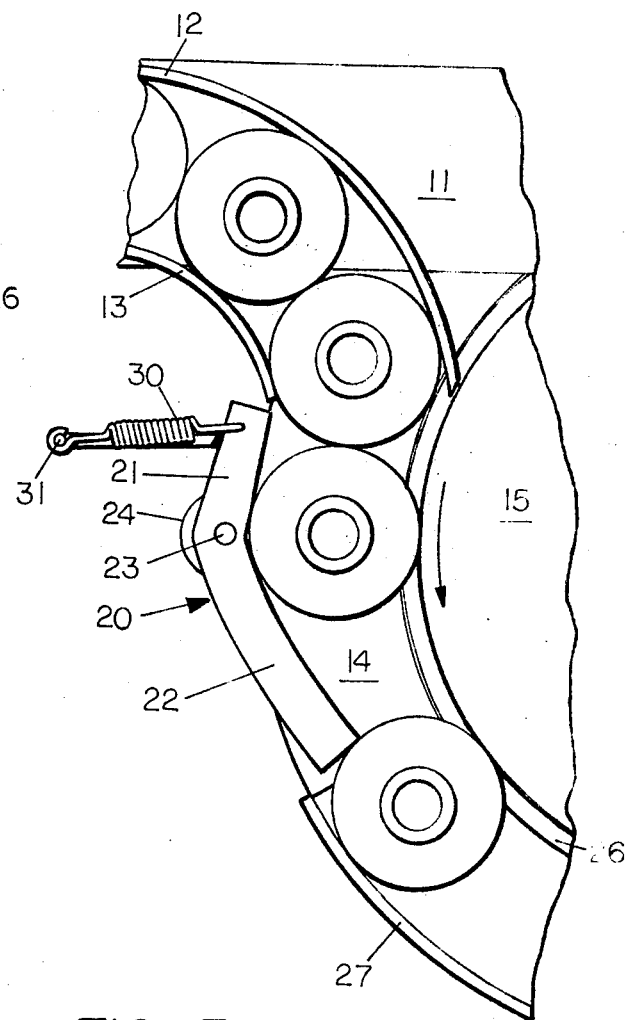
FIG. 3 is a view similar to FIG. 2, showing the containers in a slightly different period of time.

With particular reference to FIG. 2, there is shown, in point of time, the operation of the gate or arm 20 where a container has been passed by the gate but is in contact with the long leg of the arm, thus maintaining the arm, which is under the tension of spring 30, in the position shown. As can be readily seen, the short leg of the arm blocks the entry of the next container into the handling mechanism of the testing device. The container which is blocked is retained between the rails 12 and 13 and is held out of contact with the wheel 15 so that the container is in a non-rotating attitude. Once the container, which is in contact with the long leg 22, passes beyond leg 22, the spring 30 will pivot the arm 20 to the position shown in FIG. 3, at which time the bottle which has been blocked in the gate will move forward under line pressure and come into contact with the wheel 15 which will begin to move the container around the periphery of the wheel. As the container moves with the wheel 15 in the direction of its rotation, it will contact the long leg of the arm 20 causing the arm 20 to pivot clockwise about pivot 23 bringing the short leg into blocking position with respect to the next container in line.

The distinct advantage of the particular gating arrangement is its operability without the necessity of cams or mechanisms which may malfunction or tend to complicate the functional operation of a gating device. It is important in many instances where containers are being inspected that they be rotated rapidly about their axis so that the gauging may be made of the whole circumference of the container in a very short time. In the absence of a gating mechanism, the containers tend to bunch up, rub against each other and as they are rotated create a condition of excessive wear of the external surface of the containers. This wear is frequently termed "line abuse" and is experienced by glass containers throughout their handling of movement from the forming machines through the filling operations, packing, unpacking and ultimate sale to a purchaser. It is desirable to be able to inspect containers and subject them to the least amount of line abuse during such inspection.

While the present invention is specifically shown and described in combination with the entrance area into an inspection device, the invention could be used as a gating device where a line of containers are moving in a substantially linear path and the gate is mounted at one side of the path of movement of the containers on the conveyor and still function to permit one container at a time to pass through the gate. In this instance, the long leg would be straight.

It can readily be seen that the actual spacing of the containers as they leave the gate will depend upon the length of the long leg of the arm 20. Thus, if it is desirable to provide a greater degree of spacing, the long leg of the arm 20 may be made longer either by its initial fabrication or by the addition of an extension thereto.

We claim:

1. In apparatus for feeding glass containers to a test device wherein:

a moving, horizontal conveyor carries a plurality of containers in single file to a means for guiding containers from the side of the conveyor into the entrance of a testing device mounted at the side of the conveyor, the test device having container sidewall engaging means for moving the containers in precession from the entrance, to and through a testing station, the improvement comprising:

a generally arcuate, horizontal arm, said arm having a short leg and a long leg;

means mounting said arm at the entrance to said test device for pivotal movement about a vertical axis intermediate said legs;

said short leg, in a first position, contacting a container and blocking movement thereof into engagement with said container sidewall engaging means;

said long leg of said arm engaging containers that are being moved by said container engaging means to a point just prior to the testing station;

means biasing the long leg of said arm into engagement with a container;

said biasing means permitting said arm to pivot into a second position when the long leg is not in engagement with a container to thereby move the short leg out of said first position and permitting a single container to move into engagement with said engaging means and said long leg of said arm whereby containers will be fed to the testing device at spaced intervals depending on the length of said long leg.

2. The apparatus of claim 1 wherein said biasing means comprises a tension spring connected to the short leg of said arm.

3. The apparatus of claim 1 wherein container engaging means comprises a rotating wheel in engagement with the sidewall of the containers and further including guide means for returning the containers to the conveyor after passing through the test device.

4. The apparatus of claim 1 wherein said long leg of said arm is arcuate in plan view and generally parallel to the contour of the container sidewall engaging means.

5. The apparatus of claim 3 wherein said horizontal arm is mounted in generally parallel relationship with said rotating wheel at an elevation intermediate the height of said wheel.

6. The apparatus of claim 1 wherein said guiding means comprises a pair of spaced, curved end guide rails engaging opposed sides of said containers, and said short leg of said arm blocks the movement of containers from the exit of said guide rails.

* * * * *